MULTIPLEX ARRANGEMENT FOR GENERATING TIME-MODULATED PULSES

Filed Dec. 2, 1947 2 Sheets-Sheet 1

INVENTOR.
MAURICE M. LEVY
BY John A. Harvey
ATTORNEY

INVENTOR.
MAURICE M. LEVY
BY John A. Harvey
ATTORNEY

Patented May 1, 1951

2,551,024

UNITED STATES PATENT OFFICE 2,551,024

MULTIPLEX ARRANGEMENT FOR GENERATING TIME-MODULATED PULSES

Maurice M. Levy, Wembley, England, assignor to The General Electric Company, Limited, London, England Application December 2, 1947, Serial No. 789,181
In Great Britain December 20, 1946

17 Claims. (Cl. 179—15)

Figure 1:
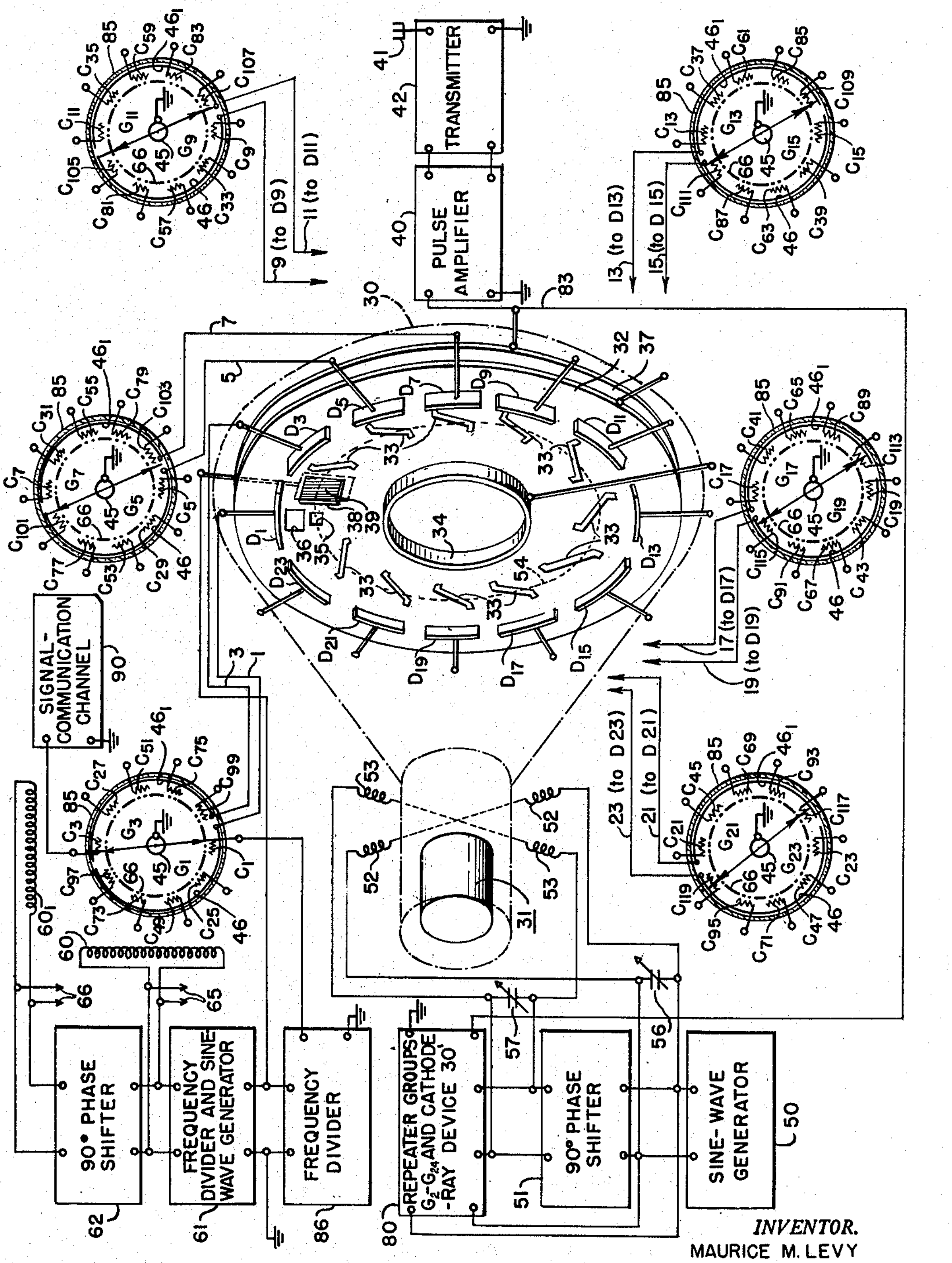

The present invention relates to multiplex arrangements for generating a plurality of groups of time-modulated pulses and, particularly, to arrangements for generating time-shared groups of time-modulated pulses representative of the information from a large number of time-shared signal-communication channels.

Radio systems utilizing pulse-time modulation offer a number of important advantages which make them preferable to other types of radio systems, for example improved signal-to-noise ratio and peak power outputs which are greatly in excess of the rated continuous-output power capabilities of the systems. Pulse-time modulation systems are useful particularly in radio-relay systems. In a pulse-time modulation system the information which is transmitted is contained in a plurality of interleaved groups of pulses, the corresponding pulses of successive groups being representative of the information from an individual signal-communication channel. As the number of signal-communication channels in a conventional system of the type just mentioned increases beyond a reasonable number, for example above about fifty, the arrangement for generating and interleaving the pulses becomes expensive and complex.

Certain prior such arrangements have required a relaxation oscillator, an amplifier of one or more stages, and a wave-shaping network for each signal-communication channel. These relaxation oscillators were controlled from a common synchronizing-signal source but, due to the different operating characteristics of individual ones thereof, produced output pulses on a time-shared basis. These output pulses were, in turn, time-modulated in accordance with the information from their corresponding signal-communication channels, shaped, and then applied to a common output circuit. Other such arrangements have required a phase-shifting network in lieu of the relaxation oscillator, amplifiers, and wave-shaping networks for each signal-communication channel. A further prior arrangement has included a cathode-ray tube with a target electrode for each channel and a rotating cathode-ray beam for cyclically scanning the target electrodes. Each such electrode is coupled to an arrangement including an amplifier and wave-shaping networks which utilize each output pulse from the target electrode and the information applied to the arrangement from its corresponding signal-communication channel to produce a time-modulated output signal. The time-modulated output pulses from the various channels are then applied to a common output circuit. Because of the requirement in such prior arrangements for so many electrical components for each channel, it will be manifest that as the number of signal-communication channels is substantially increased the number of electron tubes and associated components required becomes unreasonably large. Additionally, the switching problems in connection with time sharing to provide a large number of groups of interleaved pulses become extremely difficult. When the required number of signal-communication channels for a generator of interleaved groups of time-modulated pulses is about one hundred in number, arrangements of the type heretofore employed become impractical.

It is an object of the present invention, therefore to provide a new and improved multiplex arrangement for generating time-shared groups of time-modulated pulses which avoids one or more of the disadvantages and limitations of prior such arrangements.

It is another object of the invention to provide a new and improved multiplex arrangement for generating time-shared groups of time-modulated pulses representative of the information from a larger number of signal-communication channels than has heretofore been readily employed in communication systems.

It is a further object of the invention to provide a new and improved multiplex arrangement for generating time-shared groups of time-modulated pulses which is comparatively simple in construction and requires but a small number of electron tubes in comparison with the number of signal-communication channels which are accommodated by the arrangement.

In accordance with a particular form of the invention, a multiplex arrangement for generating time-shared groups of time-modulated pulses comprises a first plurality of signal-communication channels and cyclically operating means responsive successively during each operating cycle thereof to the signal of each of the aforesaid channels for generating a plurality of pulses individually time-modulated in accordance with a characteristic of individual ones of the above-mentioned signals. The pulse-generating arrangement also includes a plurality of groups of repeaters having individual input circuits adapted to be coupled to individual ones of a second plurality of signal-communication channels and having for each group thereof a common output circuit coupled to an individual one of the first communication channels. The arrangement further includes means for effecting successive energization of the repeaters of each of the groups and a control system arranged to control the energizing means to maintain a first synchronous relation between the energizations of corresponding repeaters of the above-mentioned groups and a second synchronous relation between the aforesaid successive energizations and the cyclic operation of the generating means.

For a better understanding of the present invention, together with other and further objects thereof, reference is had to the following description taken in connection with the accompanying drawings, and its scope will be pointed out in the appended claims.

Figure 2:
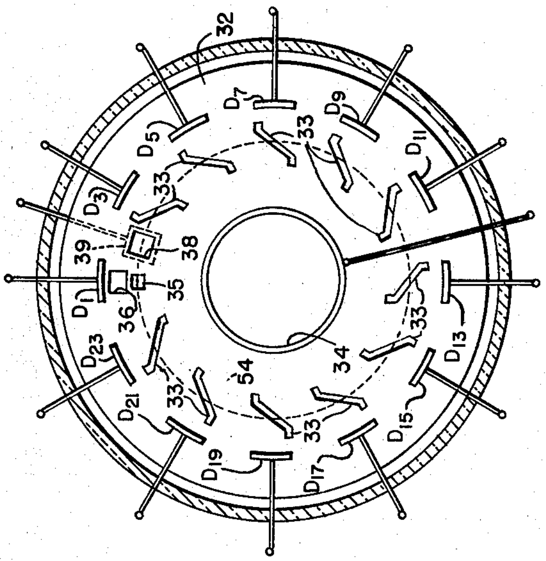
Figure 3:
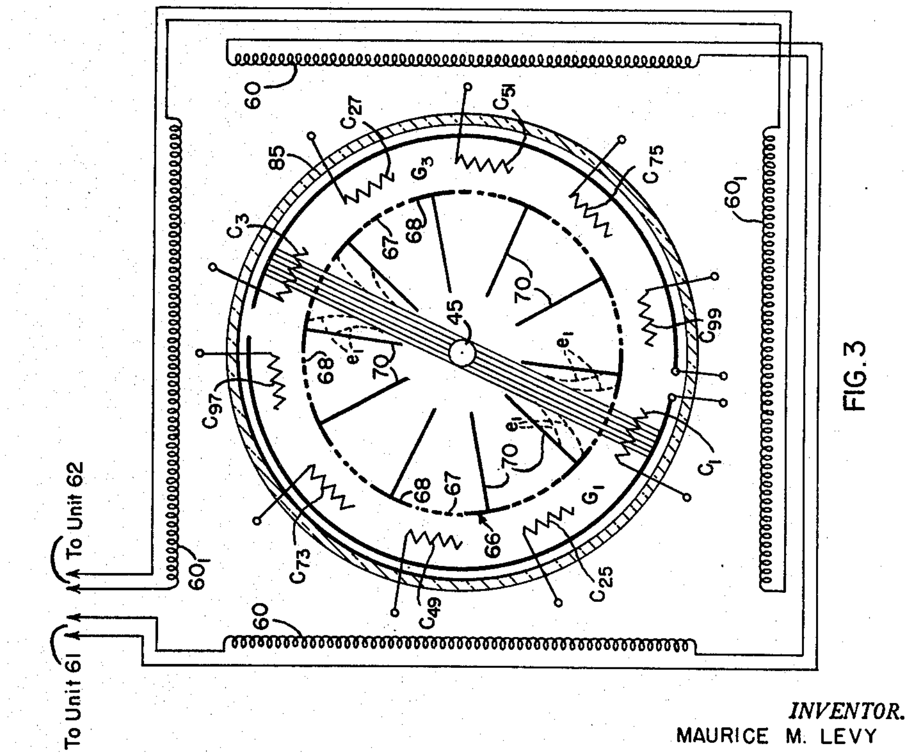

Referring now to the drawings, Fig. 1 is a circuit diagram, partly schematic, of a particular form of a multiplex arrangement in accordance with the invention for generating time-shared groups of time-modulated pulses; Fig. 2 is a cross-sectional view of a modulator tube utilized in the Fig. 1 arrangement; and Fig. 3 is a circuit diagram representing in greater detail a portion of the arrangement of Fig. 1.

Referring now more particularly to Fig. 1 of the drawings, the arrangement there shown is adapted to generate groups of time-shared time-modulated pulses representing the information from one hundred ten signal-communication channels and also to generate synchronizing-signal information. This pulse-generating arrangement comprises a first plurality of signal-communication channels, each designated by a reference number in the odd-numbered series from one to twenty-three. One end of channel 1 is coupled to a beam-deflecting electrode $D_1$ of a cathode-ray device 30 more fully described hereinafter. Corresponding ends of each of the other channels are connected in consecutive order to similar beam-deflecting electrodes designated $D_3$ to $D_{23}$. Other signal-communication channels in the even-numbered series from two to twenty-four are also employed but have not been represented to simplify the illustration. These channels are connected to beam-deflecting electrodes $D_2$ to $D_{24}$, also not shown, of a second cathode-ray device 30′ identical in construction with that of device 30. Device 30′ forms part of a unit 80 more fully to be described hereinafter. The cathode-ray device 30 comprises a cyclically operating means responsive successively during each operating cycle thereof to the signal of each of the channels $D_1$ to $D_{23}$, inclusive, for generating a plurality of pulses individually time-modulated in accordance with a characteristic of individual ones of the last-mentioned signals. The cathode-ray device 30 includes a conventional electron-gun structure 31, which is connected in a well-known manner to suitable sources of operating potentials (not shown), for developing and focusing an electron beam on a target electrode 32 mounted near the opposite or enlarged end of the device. A sine-wave voltage from a sine-wave generator 50 and a similar voltage equal in magnitude to the sine-wave voltage but displaced 90 degrees in phase with respect thereto, the latter voltage being derived from a phase shifter 51 coupled to the generator 50, are applied to respective deflecting windings 52, 52 and 53, 53 so that the electron beam developed by the electron-gun structure normally describes a circular path of uniform radius on the target electrode 32 as represented by the broken line 54. The generator 50 is preferably crystal-controlled and develops an alternating voltage having a frequency of 50 kilocycles per second for the particular embodiment of the invention under consideration. Adjustable condensers 56 and 57 are provided across the output terminals of the respective units 50 and 51 for making accurate phase adjustments of the output voltages of these units.

The target electrode 32 comprises an apertured disc interposed between an inner electrode 34 and an anode target 37. The disc 32 is preferably maintained at a suitable positive operating potential. In the particular embodiment of the invention presently under consideration, the target electrode has eleven apertures 33, 33 therein arranged 30 degrees apart and at a predetermined distance from the center of the electrode. These apertures may be of any suitable shape depending upon the type of pulse-time modulation desired. For the usual pulse-displacement type, the apertures preferably are elongated slits having a uniform width and each aperture is disposed at a given angle with respect to a radius extending from the center of the target electrode to the center of the aperture. The target electrode 32 thus comprises a structure having pulse-signal generating portions or apertures 33, 33 which are slanting with relation to the path of scanning of the electron beam of the cathode-ray device 30 across the apertures. Intermediate the two upper apertures 33, 33 of the target electrode 32 is a pair of radially disposed rectangular apertures 35 and 36 of unequal size and arranged at different radial distances from the center of the target electrode. A larger rectangular aperture 38 is provided in the target electrode 32 between the slit 35 and one of the apertures 33. An auxiliary electrode 39 is mounted behind the aperture 38. The odd-numbered deflecting electrodes $D_1$ to $D_{23}$, inclusive, are arranged in a circle symmetrical with relation to the axis of the cathode-ray device 30. Each electrode is positioned in radial alignment with and near an individual one of the apertures 33, as shown more clearly in Fig. 2, except for the upper electrode $D_1$ which is arranged near the rectangular aperture 36. The inner electrode 34 is connected to a source of potential (not shown) which provides a suitable fixed operating potential with relation to that normally on each of the deflecting electrodes. Referring again to Fig. 1, the anode target 37 is coupled to the input circuit of a pulse amplifier 40 and is suitably energized by this input circuit to a value of potential comparable to that usually applied to the anode electrode of a cathode-ray tube. The output circuit of the amplifier 40 is coupled to a modulation circuit of a conventional radio-frequency transmitter 42 having an output circuit coupled to an antenna system 41.

The arrangement for generating time-modulated pulses also includes a plurality of odd-numbered groups $G_1$ to $G_{23}$, inclusive, of electron-tube repeaters having individual input circuits adapted to be coupled to individual ones of a second plurality of signal-communication channels and having for each group thereof a common output circuit coupled to an individual one of the first channels 1, 3, 5, etc. Even-numbered groups $G_2$ to $G_{24}$ are connected in a similar manner through even-numbered channels 2, 4, 6, etc. to the other cathode-ray device 30′. For simplicity of illustration the devices just mentioned are included in the unit 80. These repeaters are of the vacuum-tube type and each two groups of them are constructed in a common vacuum-tube envelope 85, for example, repeater groups $G_1$ and $G_3$ are in one envelope, $G_5$ and $G_7$ in another, etc. Each two groups of repeaters includes a common cathode 45 in the form of an elongated cylinder extending perpendicular to the plane of the drawing. Each group includes in common an element of a split cylindrical anode 46, 46$_1$ which is coaxial with the cathode 45 thereof. Suitable sources of operating potentials (not shown) are connected to the anode elements 46, 46$_1$ and to the cathode 45 of each pair of groups to produce a radial electric field between the anode elements and the cathode. A plurality of control electrodes, five for each of the groups $G_1$, $G_3$, etc. of repeaters, are arranged in a uniformly spaced circular relation intermediate the cathode 45 and the split anode elements 46, 46$_1$. These control electrodes, designated $C_1$, $C_3$, $C_5$, etc., correspond in number to that of the second plurality of signal-communication channels. The latter are adapted to be coupled to individual ones of the control electrodes. Each of these last-mentioned signal-communication channels is employed to supply to the pulse-generating arrangement information that is to be time-modulated on a time-shared basis. To avoid unduly complicating the arrangement shown in Fig. 1, only one such signal-communication channel 90 is shown and this channel is coupled to the control electrode $C_3$. The remaining channels may be individually connected to the other control electrodes. Control signals are applied to the control electrode $C_1$ in a manner to be described subsequently. Accordingly the control electrodes $C_{25}$, $C_{49}$, $C_{73}$, and $C_{97}$ of the repeater group $G_1$ are not utilized in the particular embodiment of the invention under consideration. This is also true for the corresponding electrodes of the even-numbered group $G_2$ included in the unit 80.

It will be apparent from the foregoing description that the group $G_1$ of repeaters includes five distinct repeaters having a common cathode 45 and a common anode element 46 but each having an individual control electrode. The group $G_3$ of repeaters also has the same cathode 45, a common anode element 46$_1$, but each repeater has an individual control electrode. The remaining pairs of groups $G_5$, $G_7$, etc. of repeaters are similar in arrangement.

The pulse-generating arrangement further includes means for effecting successive energization of the repeaters of each of the groups. This means in particular comprises means for producing a magnetic field rotatable about each of the cathodes 45. To this end, each two groups of repeaters having a common cathode are provided with two pairs of windings 60, 60 and 60$_1$, 60$_1$ (only one winding of each pair being represented for but a single group of repeaters $G_1$, $G_3$ being shown in Fig. 1, to simplify the drawing) disposed to produce space-quadrature magnetic fields. The windings 60, 60 are coupled to the output circuit of a frequency divider and sine-wave generator 61 while the windings 60$_1$, 60$_1$ are coupled to the output circuit of a 90-degree phase shifter 62, the input circuit of which is coupled to the output circuit of the unit 61. The frequency divider portion of unit 61 is capable in the arrangement shown of providing a ten-to-one frequency division. The windings 60, 60 and 60$_1$, 60$_1$ are preferably adjustable about the cathode of each of the repeater groups for making minor phase adjustments. The windings for each two repeater groups having a common cathode are displaced a small angle with respect to the windings of the other pairs of repeater groups to provide the proper phase relations. Energizing circuits 65, 65 and 66, 66 extend to the corresponding windings of the other pairs of repeater groups. The configurations of the windings 60, 60 and 60$_1$, 60$_1$ and the phase relations of the energy supplied thereto are such that a uniform magnetic field is produced in a direction parallel to a diameter of the split anode 46, 46$_1$ and this uniform field is rotatable about the longitudinal axis of the cathode 45.

The construction and operation of electron-tube devices constructed similar to each of the pairs of repeater groups $G_1$—$G_3$, $G_5$—$G_7$, etc. are described in detail in a paper by A. M. Skellett entitled "The Magnetically Focused Radial Beam Vacuum Tube" appearing in the April 1944 issue of The Bell System Technical Journal at pages 190 to 202, and reference is made thereto for a more complete understanding of such devices.

The generator of time-modulated pulses herein described additionally includes means dependent on the cyclic operation of the cathode-ray device 30 for controlling the last-described energizing means, which includes the units 61, 62 and windings 60, 60 and 60$_1$, 60$_1$, to maintain a first synchronized relation between the energizations of corresponding repeaters of the several groups thereof and a second synchronized relation between such successive energizations of the repeaters and the cyclic operation of the cathode-ray device 30. This means includes the auxiliary electrode 39 which is coupled to the windings 60, 60 and 60$_1$, 60$_1$ through the units 61 and 62 respectively. A frequency divider 86 having its output circuit coupled to the control electrode $C_1$ and its input circuit coupled to the auxiliary electrode 39 is provided for a purpose to be explained hereinafter. Unit 86 affords a five-to-one frequency division.

The generator of the present invention further includes means for reducing the undesirable effects of electrons which unavoidably separate from the electron stream of each of the repeater groups and impair the successive energization of adjacent repeaters thereof. The electron stream just mentioned is developed between the anode and the cathode of each of the groups, and will be described in greater detail subsequently. This last-mentioned means is shown more clearly in Fig. 3 of the drawings and comprises a shield electrode 66 intermediate the cathode 45 and the split anode 46, 46$_1$. The shield electrode 66 comprises a cylindrical grid concentric with the cathode 45 including perforated portions 67, disposed directly in front of the individual control electrodes $C_3$, $C_{27}$, etc., and portions 68 impermeable by electrons issuing from the cathode 45. The shield electrode 66, which is maintained at a suitable fixed operating potential by a bias source not shown, further includes a plurality of uniformly spaced radial fins 70, 70 of sheet material which extend inwardly from the portions 68, 68 toward the cathode 45.

As previously mentioned, only the odd-numbered signal-communication channels (which are connected to the correspondingly identified deflecting electrodes $D_1$, $D_3$, $D_5$, etc. of the cathode-ray device 30) have been shown and described in detail to simplify the representation and the understanding of the Fig. 1 embodiment of the present invention. To accommodate the even-numbered ones of the one hundred ten usable channels, a second unit or system 80, which is arranged substantially identically to that shown in detail in the drawings, is required. This system includes the even-numbered repeater groups $G_2$ to $G_{24}$ and these groups are adapted to have applied to the individual repeaters thereof the information from another group of signal-communication channels, not shown. Phase-quadrature voltages for the rotation of the electron beam of this second cathode-ray device 30' are supplied thereto from the terminal units 50 and 51. The rotary magnetic field for each of the repeater groups of the system 80 is supplied by units included therein and identical with units 60, 60, $60_1$, $60_1$, 61 and 62. The output pulses from the anode target of the second cathode-ray device 30' are applied to the input circuit of the pulse amplifier 40. The rotation of the electron beam of the cathode-ray device 30' is so controlled with respect to that of the cathode-ray device 30 that the electron beam of the former traverses one of the apertures in its target electrode exactly at the instant that the beam of device 30 is intermediate the corresponding aperture in its target electrode and the next adjacent aperture thereof. This control is ordinarily effected by movement of the windings corresponding to the windings 52, 52 and 53, 53 about the neck of the second cathode-ray device.

Considering now the operation of the arrangement just described and assuming initially that no signals are applied to the deflecting electrodes $D_1$, $D_3$, $D_5$, etc., the phase-quadrature voltages applied to the windings 52, 52 and 53, 53 from units 50 and 51 cause the electron beam developed by the electron gun 31 of the cathode-ray device 30 to describe the circular path 54 on the target electrode 32 at a rate of 50 kilocycles per second. During the course of each such revolution, the electron beam passes through the aperture 38 in the target electrode 32 and strikes the auxiliary electrode 39, thus developing a control pulse which is applied to the input circuit of the frequency divider and sine-wave generator 61. This control pulse is effective to synchronize the operation of the unit 61 in a desired submultiple relation with that of the cathode-ray device 30. A ten-to-one frequency division is effected in unit 61. The output signal of the latter comprises a sine wave having a frequency of 5 kilocycles per second and this voltage is applied to the windings 60, 60 of each of the repeater groups $G_1$, $G_3$, $G_5$, etc. and is also applied to the phase shifter 62. The latter develops a voltage displaced 90 degrees in phase with respect to that generated by the unit 61 and applies this voltage to the windings $60_1$, $60_1$ of the repeater groups just mentioned. A uniform magnetic field is developed parallel to a diameter of the split anode 46, $46_1$ (Fig. 3) of each pair of repeater groups and this field rotates about the axis of the cathode 45 at a frequency of 5 kilocycles per second. This rotary magnetic field cooperates with the electric field existing between the split anode and the cathode of each pair of repeater groups and develops between the split anode and the cathode thereof two radial electron streams which extend along a diameter and which rotate about the axis of the cathode at a rate of 5 kilocycles per second.

Voltages corresponding to individual messages or other information are applied to individual ones of the control electrodes of the repeater groups $G_1$, $G_3$, $G_5$, etc. Each voltage is effective to alter the transconductance of the repeater to which it is supplied in accordance with the instantaneous values of that voltage during the interval of time that its control electrode is in the path of the rotating electron streams. Therefore, the potentials of the two segments of the split anode 46, $46_1$ will be dependent on these momentarily varying transconductances. The changing potentials of the split anode are applied through the signal-communication channels 1, 3, 5, etc. to the deflecting electrodes $D_1$, $D_3$, $D_5$, etc. of the cathode-ray device 30. These changing potentials on the deflecting electrodes cause the electron beam of the cathode-ray device 30 to deviate radially inwardly or outwardly from its normal or circular path 54 to an extent dependent upon the magnitude of each deflecting-electrode potential at the moment the electron beam reaches the aperture associated with its corresponding deflecting electrode. A negative pulse is produced on the anode target 37 by the electron beam each time it traverses an aperture 33 and, because of the described angular position of that aperture, the time of occurrence of the generated pulse corresponds to the extent of departure of the electron beam from its circular path 54 and thus to the instantaneous value of the modulating signal applied to a related control electrode of a repeater.

Since the electron beam of a cathode-ray device 30 makes ten revolutions to each revolution of the electron streams about each of the cathodes of the pairs of repeater groups $G_1$, $G_3$, etc., the former completes one revolution while the electron stream just mentioned rotates through 36 degrees. Considering the particular positions of the electron streams shown in Fig. 1 for the repeater groups $G_{17}$, $G_{19}$, $G_{21}$, and $G_{23}$, it will be seen that those signal-communication channels which are coupled to the control electrodes $C_{113}$, $C_{115}$, $C_{117}$, and $C_{119}$ are all applying individual values of signal voltage to the deflecting electrodes $D_{17}$, $D_{19}$, $D_{21}$, and $D_{23}$ through two pairs of the split anodes 46, $46_1$ and the signal-communication channels 17, 19, 21, and 23. When the electron beam of the cathode-ray device rotates to a position where it is influenced by the deflecting electrode $D_{17}$, the beam is deflected radially in accordance with the instantaneous value of the voltage on the control electrode $C_{113}$ and a negative pulse is developed at the anode target 37 at a time which is dependent on this voltage. About one and two-thirds microseconds later the electron beam is deflected by the electrode $D_{19}$, assuming clockwise rotation of the electron beam, and a pulse which is time-modulated in accordance with the instantaneous value of the voltage on control electrode $C_{115}$ is developed. This operation continues with relation to the deflecting electrodes $D_{21}$ and $D_{23}$. When the electron streams of the pairs of repeater groups sweep across the next succeeding control electrodes thereof, corresponding time-modulated pulses are generated in accordance with the instantaneous values of the voltages applied to these control electrodes. Since both halves of the spilt anode 46, $46_1$ of the pairs of repeater groups are simultaneously influenced by the radial electron streams which extend along the diameter of the split anode, a group of time-modulated pulses is generated during one-half revolution of the electron beam of the cathode-ray device and each pulse of the group is time-modulated in accordance with the information individual to a corresponding one of the signal-communication channels which are coupled to the control electrodes of the repeaters. Thus, after five revolutions of the electron beam and one-half revolution of individual electron streams, the time modulation or sampling operation of the information applied to the control electrodes of the repeater groups is repeated.

In a pulse-time modulation system it is usually desirable to generate and to transmit synchronizing pulses for synchronizing units of the receiver with similar units of the transmitter. These synchronizing pulses are generated by the passage of the electron beam of the cathode-ray device 30 over the rectangular apertures 35 and 36 in the target electrode 32. Each rotation of the electron beam over the aperture 35 develops a short-duration synchronizing signal. Every fifth pulse applied to the input circuit of the frequency divider 86 from the auxiliary electrode 39 is translated by the output circuit of unit 86 to the control electrode $C_1$. Consequently, at every fifth revolution of the electron beam of the cathode-ray device 30 a potential is applied to the deflecting electrode $D_1$ which causes the beam to sweep across the aperture 36 thereby developing on the anode target 37 a long-duration synchronizing pulse. Since the anode 46 of the repeater group $G_1$ is coupled to the synchronizing deflecting electrode $D_1$ and is associated with all of the control electrodes $C_1$, $C_{25}$, $C_{49}$, $C_{73}$, and $C_{97}$, the generation of the last-mentioned synchronizing pulse will necessitate that no signal-communication channel be coupled to any of the last-mentioned control electrodes. Accordingly control electrodes $C_{25}$, $C_{49}$, $C_{73}$, and $C_{97}$ remain unconnected.

Considering for the moment the repeater groups $G_1$ and $G_3$ represented in Fig. 3, it will be apparent that some electrons $e_1$ will unavoidably separate from the correct path of the electron stream developed between the cathode 45 and the split anode 46, $46_1$. Ordinarily some of these stray electrons would reach the anode 46, $46_1$ under the control of signal voltages on the control electrodes of channels adjacent the desired operative ones and by thus energizing the adjacent repeaters produce undesirable cross talk. The radial fins 70, 70 and the portions 68, 68 of the shield electrode 66 intercept the stray electrons $e_1$ and prevent them from reaching the vicinity of the adjacent control electrodes, thus assuring operation relatively free from cross talk.

The even-numbered channels and the second cathode-ray device of the system 80 are effective to develop output pulses in the manner just described and these pulses are applied to the input circuit of the pulse amplifier 40. The pulses developed by the system 80 (to which the even-numbered signal-communication channels 2 to 120, inclusive, are coupled) are so phased that they are positioned effectively midway between the time-modulated pulses generated by the cathode-ray device 30 under control of the odd-numbered channels 1 to 119, inclusive. These groups of time-shared time-modulated pulses are amplified by unit 40 and are employed to modulate wave signals generated by the transmitter 42 which thus develops pulses of radio-frequency energy for application to and radiation by the antenna 41.

From the foregoing description of an arrangement embodying the present invention, it will be apparent that the arrangement is capable of utilizing the information from one hundred ten signal-communication channels and is effective to develop time-shared groups of time-modulated pulses representative of the information applied to each of the foregoing channels. In addition, synchronizing-signal pulses are also generated. These time-modulated pulses are generated with equipment which utilizes a small number of electron tubes and employs circuit arrangements which are not unduly complex. While the invention has been described in connection with an arrangement for accommodating the information from one hundred ten channels, it will be manifest that arrangements in accordance with the present invention can be made to accommodate a greater or lesser number of signal-communication channels as desired for a particular application. An arrangement in accordance with the invention, and utilizing the information from a large number of signal-communication channels to generate time-shared groups of time-modulated pulses therefrom, is relatively simple in construction and of low cost yet is characterized by consistently high reliability of operation.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A multiplex arrangement for generating time-shared groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels; means for effecting successive energization of the repeaters of each of said groups; and a control system arranged to control said energizing means to maintain a first synchronous relation between the energizations of corresponding repeaters of said groups and a second synchronous relation between said successive energizations and said cyclic operation of said generating means.

2. A multiplex arrangement for generating time-shaped groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels; means for effecting successive energization of the repeaters of each of said groups; and a control system actuated by said cyclically operating means for controlling said energizing means to maintain a first synchronous relation between the energizations of corresponding repeaters of said groups and a second synchronous relation between said successive energizations and said cyclic operation of said generating means.

3. A multiplex arrangement for generating time-shaped groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, the repeaters of each of said groups being responsive to a moving magnetic field to effect successive energization thereof; means for producing a moving magnetic field for each of said groups to effect said successive energization of the repeaters thereof; and a control system arranged to control said energizing means to maintain a first synchronous relation between the energization of corresponding repeaters of said group and a second synchronous relation between said successive energizations and said cyclic operation of said generating means.

4. A multiplex arrangement for generating time-shared groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, the repeaters of each of said groups being responsive to a rotating magnetic field to effect successive energization thereof; means for producing a rotating magnetic field for each of said groups to effect said successive energization of the repeaters thereof; and a control system arranged to control said energizing means to maintain a first synchronous relation between the energizations of corresponding repeaters of said groups and a second synchronous relation between said successive energizations and said cyclic operation of said generating means.

5. A multiplex arrangement for generating time-shared groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of electron-tube repeaters having individual input circuits adapted to be coupled to individual ones of a second plurality of signal-communication channels, the repeaters of each group thereof being positioned in a circular arrangement around a common cathode and having a common output circuit including said cathode coupled to an individual one of said first channels; means for producing a magnetic field rotatable about each of said cathodes to effect successive energization of the repeaters of each of said groups; and a control system arranged to control said energizing means to maintain a first synchronous relation between the energizations of corresponding repeaters of said groups and a second synchronous relation between said successive energizations and said cyclic operation of said generating means.

6. A multiplex arrangement for generating time-shared groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, said each group of repeaters having a common anode arranged around a common cathode; means for producing between the anode and the cathode of said each group an electron stream rotatable about said cathode thereof to effect successive energization of the repeaters of said each group; and a control system arranged to control said energizing means to maintain a first synchronous relation between the energizations of corresponding repeaters of said groups and a second synchronous relation between said successive energizations and said cyclic operation of said generating means.

7. A multiplex arrangement for generating time-shared groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, said each group of repeaters having an elongated anode and an elongated cathode arranged in coaxial relationship; means for producing between said coaxial anodes and cathodes individual electron streams rotatable about the axis of individual ones of said cathodes to effect successive energization of the repeaters of each of said groups; and a control system arranged to control said energizing means to maintain a first synchronous relation between the energizations of corresponding repeaters of said groups and a second synchronous relation between said successive energizations and said cyclic operation of said generating means.

8. A multiplex arrangement for generating time-shared groups of time-modulated pulses comprising: a first plurality of signal-communication channels; cyclically operating means responsive successively during each operating cycle thereof to the signal of each of said channels for generating a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels; means for effecting successive energization of the repeaters of each of said groups; and a control system coupled between said energizing means and said cyclically operating means and responsive to the cyclic operation thereof for controlling said energizing means to maintain a first synchronous relation between the energizations of corresponding repeaters of said groups and a second synchronous relation between said successive energizations and said cyclic operation of said generating means.

9. A multiplex arrangement for generating time-shared groups of time-modulated pulses comprising: a first plurality of signal-communication channels; a cyclically operating cathode-ray device responsive successively during each operating cycle thereof to the signal of each of said channels for generating a plurality of pulses individually time-modulated in accordance with the amplitude of individual ones of said signals; a plurality of groups of repeaters having individual input circuits adapted to be coupled to individual ones of a second plurality of signal-communication channels and having for each group thereof a common output circuit coupled to an individual one of said first channels, the repeaters of each of said groups being responsive to a rotating magnetic field to effect successive energizations thereof; means for providing a rotating magnetic field for each of said groups to effect said successive energization of the repeaters thereof; and a control system arranged to control said rotating magnetic field to maintain a first synchronous relation between the energizations of corresponding repeaters of said groups and a second synchronous relation between said successive energizations and said cyclic operation of said cathode-ray device.

10. A multiplex arrangement for generating time-shared groups of time-modulated pulses comprising: a first plurality of signal-communication channels; a cathode-ray device including a target-electrode structure having elongated pulse-signal generating portions slanting with relation to the path of scanning of the electron beam of said device across said portions; means for cyclically scanning said target-electrode structure with said electron beam; means responsive to the signals from said channels for modifying the path of said electron beam during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels; means for effecting successive energization of the repeaters thereof; and a control system arranged to control said energizing means to maintain a first synchronous relation between the energizations of corresponding repeaters of said groups and a second synchronous relation between said successive energizations and said cyclic scanning of said target-electrode structure.

11. A multiplex arrangement for generating time-shared groups of time-modulated pulses comprising: a first plurality of signal-communication channels; a cathode-ray device including a target-electrode structure having elongated pulse-signal generating portions slanting with relation to the path of scanning of the electron beam of said device across said portions; means for cyclically scanning said target-electrode structure with said electron beam; means responsive to the signals from said channels for modifying the path of said electron beam during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels; means for effecting successive energization of the repeaters thereof; and a control system actuated by said electron beam during said cyclic scanning of said target-electrode structure for controlling said energizing means to maintain a first synchronous relation between the energizations of corresponding repeaters of said groups and a second synchronous relation between said successive energizations and said cyclic scanning of said target-electrode structure.

12. A multiplex arrangement for generating time-shared groups of time-modulated pulses comprising: a first plurality of signal-communication channels; a cathode-ray device including an auxiliary electrode and a target-electrode structure having elongated pulse-signal generating portions slanting with relation to the path of scanning of the electron beam of said device across said portions; means for cyclically scanning said target-electrode structure with said electron beam; a plurality of beam-deflecting electrodes arranged in spaced relation in said device adjacent said scanning path and individually coupled to individual ones of said channels and responsive to the signals from corresponding ones of said channels for modifying the path of said electron beam during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels; means for effecting successive energization of the repeaters thereof; and a control system including said auxiliary electrode and responsive to said electron beam during said cyclic scanning of said target electrode for controlling said energizing means to maintain a first synchronous relation between the energizations of corresponding repeaters of said groups and a second synchronous relation between said successive energizations and said cyclic scanning of said target-electrode structure.

13. A multiplex arrangement for generating time-shared groups of time-modulated pulses comprising: a first plurality of signal-communication channels; a cathode-ray device including an auxiliary electrode and a target-electrode structure having pulse-signal generating portions slanting with relation to the path of the electron beam of said device across said portions; means for cyclically scanning said target-electrode structure with said electron beam; a plurality of beam-deflecting electrodes individually coupled to individual ones of said channels and responsive to the signals from corresponding ones of said channels for modifying the path of said electron beam during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, each group including a cylindrical anode and a cylindrical cathode for producing a radial electric field therebetween; means for producing individual magnetic fields perpendicular to and rotatable about the axes of individual ones of said cathodes and co-operating with the electric field associated therewith to provide between said anode and said cathode of each of said groups an electron stream rotatable about the cathode thereof for effecting successive energization of the repeaters thereof; and a control system including said auxiliary electrode and responsive to said electron beam during said cyclic scanning of said target electrode for controlling said energizing means to maintain a first synchronous relation between the energizations of corresponding repeaters of said groups and a second synchronous relation between said successive energizations and said cyclic scanning of said target-electrode structure.

14. A multiplex arrangement for generating time-shared groups of time-modulated pulses comprising: a first plurality of signal-communication channels; a cathode-ray device including a target-electrode structure having elongated apertures slanting with relation to the path of scanning of the electron beam of said device across said apertures; means for cyclically scanning said target-electrode structure with said electron beam; and means responsive to the signals from said channels for modifying the path of said electron beam across said apertures during predetermined scanning cycles so that said device generates synchronizing pulses and for modifying said path during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels; means for effective successive energization of the repeaters thereof; and a control system arranged to control said energizing means to maintain a synchronous relation between the energizations of corresponding repeaters of said groups and a second synchronous relation between said successive energizations and said cyclic scanning of said target-electrode structure.

15. A multiplex arrangement for generating time-shared groups of time-modulated pulses comprising: a first plurality of signal-communication channels; a cathode-ray device including a target-electrode structure having pulse-signal generating portions slanting with relation to the path of scanning of the electron beam of said device across said portions; means for cyclically scanning said target-electrode structure with said electron beam; means responsive to the signals from said channels for modifying the path of said electron beam during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, each group including a cylindrical anode and a cylindrical cathode, the repeaters of each of said groups being responsive to a rotating electron stream between said anode and said cathode to effect successive energization thereof; means for producing between the anode and the cathode of each of said groups an electron stream rotatable about the cathode thereof for effecting said successive energization of the repeaters thereof; means for reducing the effect of electrons which separate from said electron streams of each of said groups and tend to impair said successive energization of adjacent repeaters thereof; and a control system actuated by said electron beam during said cyclic scanning of said target electrode for controlling said energizing means to maintain a first synchronous relation between the energizations of corresponding repeaters of said groups and a second synchronous relation between said successive energizations and said cyclic scanning of said target-electrode structure.

16. A multiplex arrangement for generating time-shared groups of time-modulated pulses comprising: a first plurality of signal-communication channels; a cathode-ray device including a target-electrode structure having pulse-signal generating portions slanting with relation to the path of scanning of the electron beam of said device across said portions; means for cyclically scanning said target-electrode structure with said electron beam; means responsive to the signals from said channels for modifying the path of said electron beam during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, each group including a cylindrical anode and a cylindrical cathode, the repeaters of each of said groups being responsive to a rotating electron stream between said anode and said cathode to effect successive energization thereof; means for producing between the anode and the cathode of each of said groups an electron stream rotatable about the cathode thereof for effecting said successive energization of the repeaters thereof; a shield electrode intermediate said anode and said cathode of each of said groups for reducing the effect of electrons which separate from said electron streams of each of said groups and tend to impair said successive energization of adjacent repeaters thereof; and a control system actuated by said electron beam during said cyclic scanning of said target electrode for controlling said energizing means to maintain a first synchronous relation between the energizations of corresponding repeaters of said groups and a second synchronous relation between said successive energizations and said cyclic scanning of said target-electrode structure.

17. A multiplex arrangement for generating time-shared groups of time-modulated pulses comprising: a first plurality of signal-communication channels; a cathode-ray device including a target-electrode structure having pulse-signal generating portions slanting with relation to the path of scanning of the electron beam of said device across said portions; means for cyclically scanning said target-electrode structure with said electron beam; means responsive to the signals from said channels for modifying the path of said electron beam during each scanning cycle thereof so that said device generates a plurality of pulses individually time-modulated in accordance with a characteristic of individual ones of said signals; a plurality of groups of repeaters having individual input circuits adapted to be coupled to individual ones of a second plurality of signal-communication channels and having for each group thereof a common output circuit coupled to an individual one of said first channels, each group including a cylindrical anode and a cylindrical cathode, the repeaters of each of said groups being responsive to a rotating electron stream between said anode and said cathode to effect successive energization thereof; means for producing between the anode and the cathode of each of said groups an electron stream rotatable about the cathode thereof for effecting said successive energization of the repeaters thereof; a shield electrode intermediate said anode and said cathode of each of said groups and having a plurality of radial members extending toward said cathode for reducing the effect of electrons which separate from said election streams of each of said groups and tend to impair said successive energization of adjacent repeaters thereof; and a control system actuated by said electron beam during said cyclic scanning of said target electrode for controlling said energizing means to maintain a first synchronous relation between the energizations of corresponding repeaters of said groups and a second synchronous relation between said successive energizations and said cyclic scanning of said target-electrode structure.

MAURICE M. LEVY.

REFERENCES CITED

The following references are of record in the file of this patent:

UNITED STATES PATENTS

| Number | Name | Date |
|---|---|---|
| 1,928,093 | Coyle | Sept. 26, 1933 |
| 2,036,350 | Montani | Apr. 7, 1936 |
| 2,185,693 | Mertz | Jan. 2, 1940 |
| 2,217,774 | Skellett | Oct. 15, 1940 |
| 2,391,967 | Hecht | Jan. 1, 1946 |
| 2,395,299 | Skellett | Feb. 19, 1946 |
| 2,429,631 | Labin | Oct. 28, 1947 |

FOREIGN PATENTS

| Number | Country | Date |
|---|---|---|
| 787 | Russia | Nov. 30, 1925 |
| 582,198 | Great Britain | Nov. 7, 1946 |